E. E. LAWRENCE.
DOUGH PRODUCT CUTTING MACHINE.
APPLICATION FILED JULY 17, 1912.
1,200,428.
Patented Oct. 3, 1916.
6 SHEETS—SHEET 1.
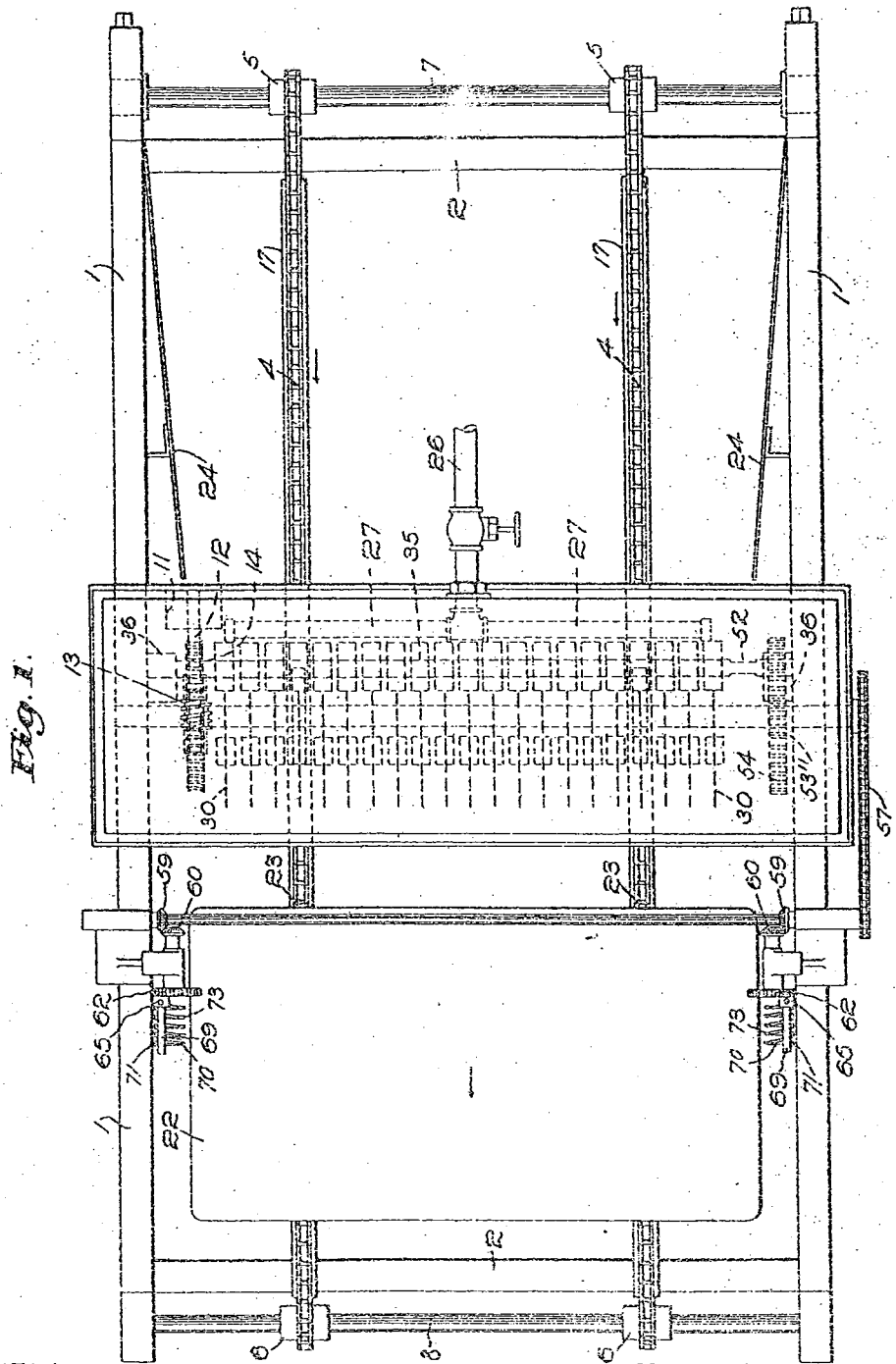
Witnesses:
Horace A. Grossman
Carl L. Choate
Inventor:
Edward E. Lawrence
by Emery, Booth, Janney & Varney
Attys.

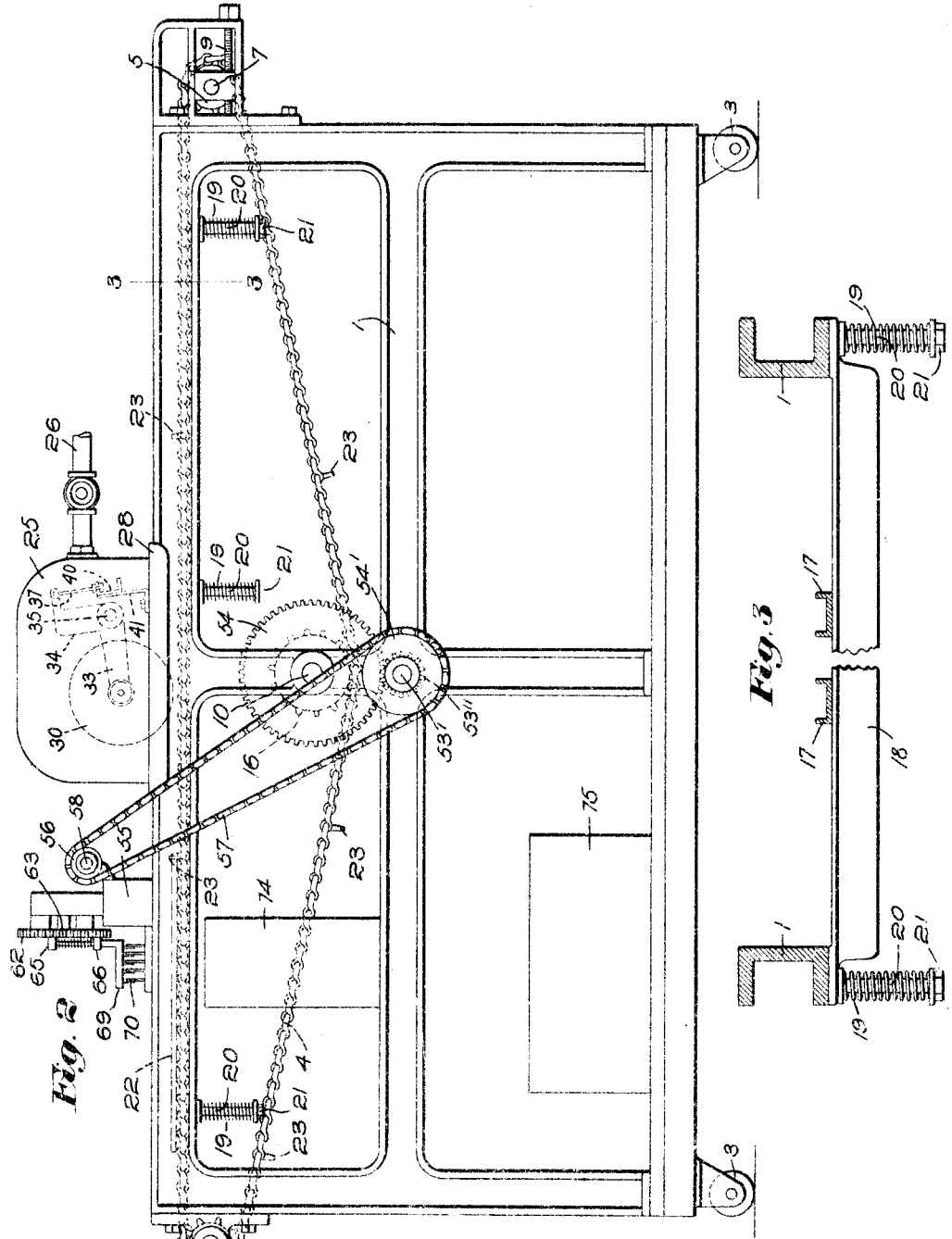

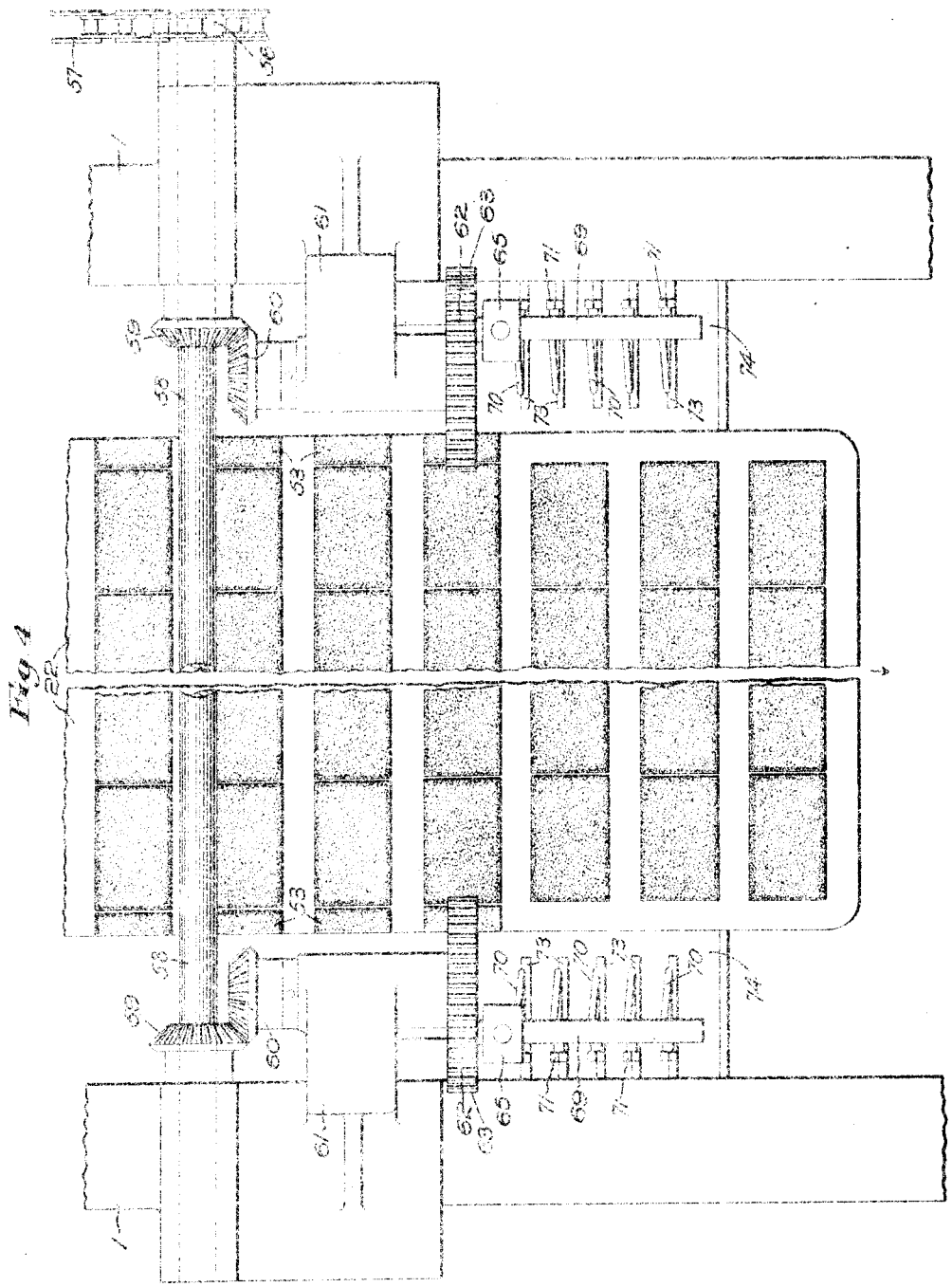

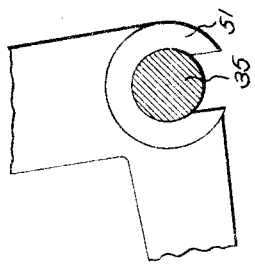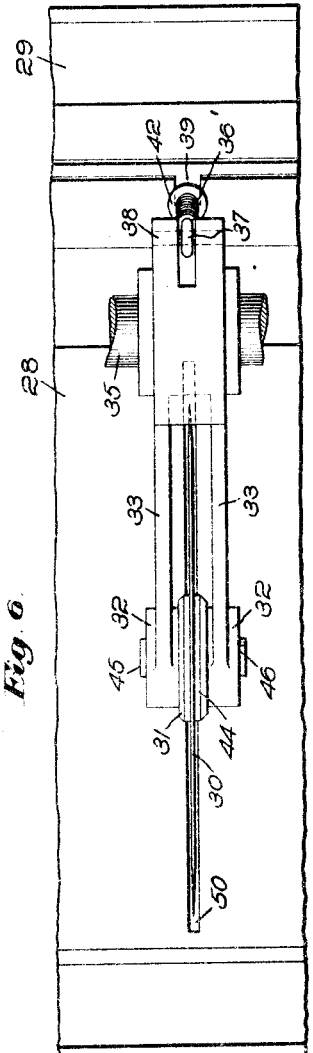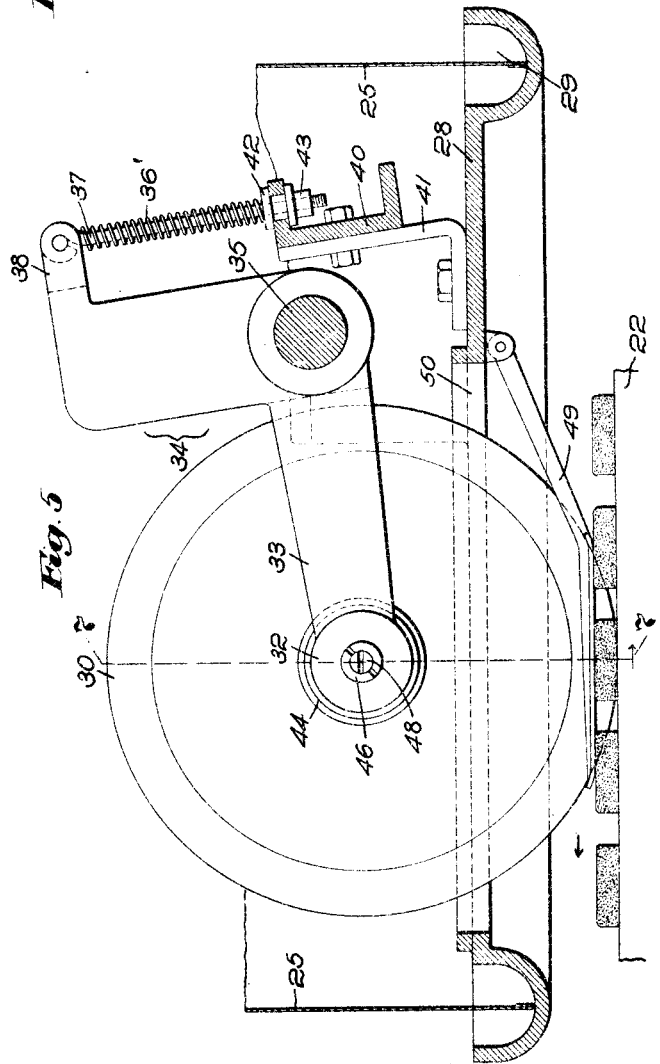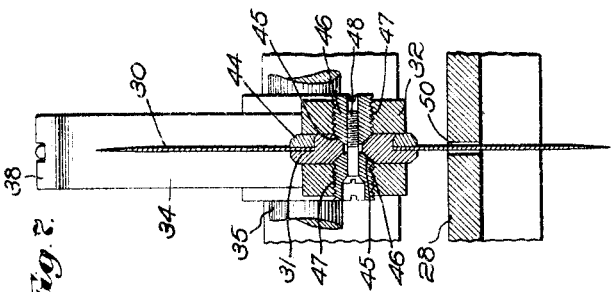

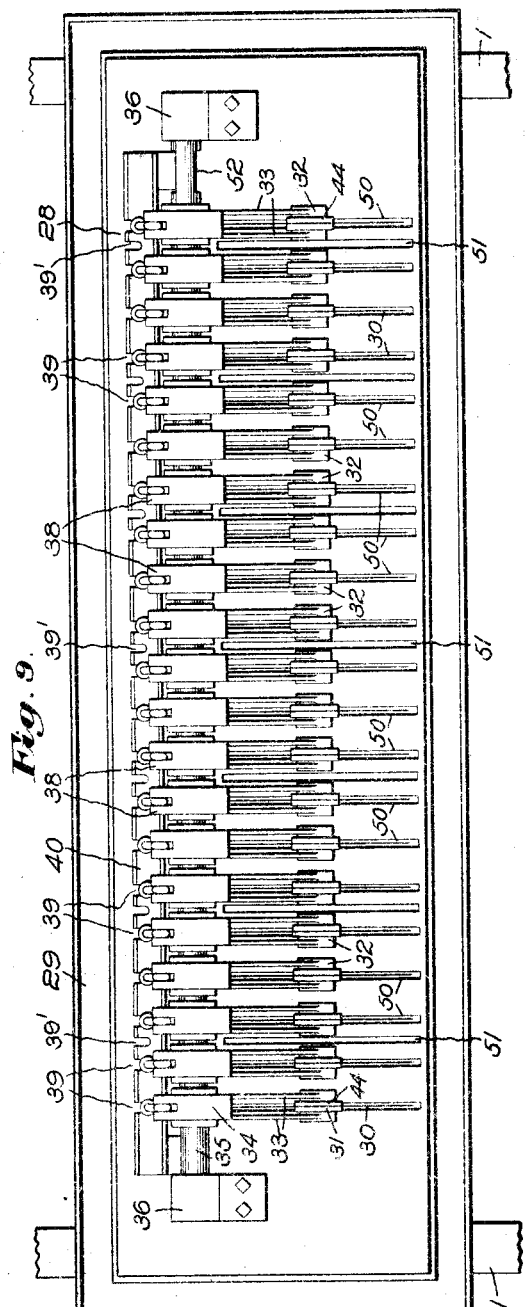
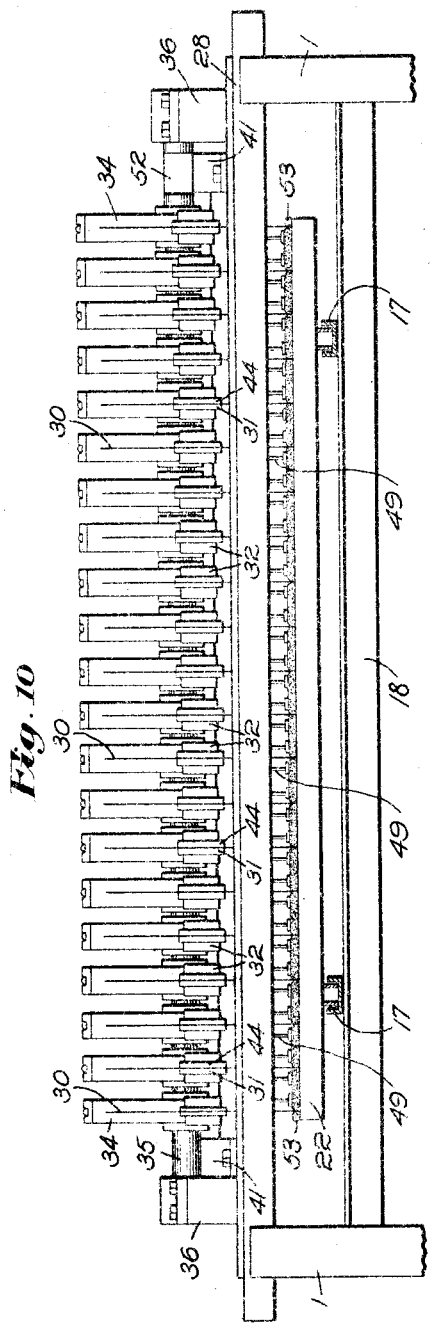

E. E. LAWRENCE.
DOUGH PRODUCT CUTTING MACHINE.
APPLICATION FILED JULY 17, 1912.
1,200,428.
Patented Oct. 3, 1916.
6 SHEETS—SHEET 6.
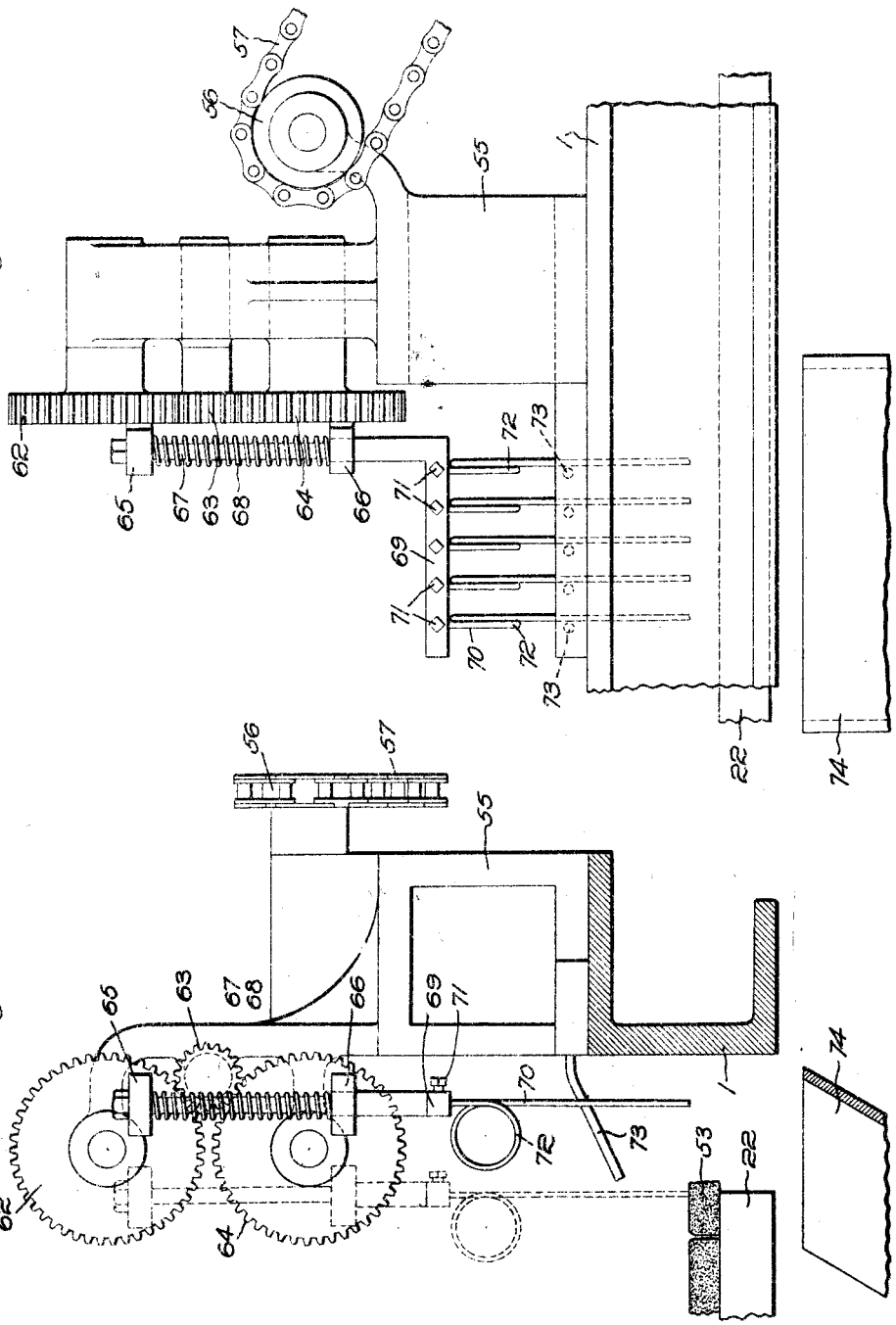
Witnesses:
Horace A. Crossman
Carl L. Choate
Inventor:
Edward E. Lawrence.
by Emery, Booth, Janney & Varney
Attys

UNITED STATES PATENT OFFICE.

EDWARD E. LAWRENCE, OF CAMBRIDGE, MASSACHUSETTS, ASSIGNOR TO LOOSE-WILES BISCUIT COMPANY, OF KANSAS CITY, MISSOURI, A CORPORATION OF MISSOURI.

DOUGH-PRODUCT-CUTTING MACHIN.

1,200,428. Specification of Letters Patent. Patented Oct. 3, 1916.

Application filed July 17, 1912. Serial No. 709,845

*To all whom it may concern:*

Be it known that I, EDWARD E. LAWRENCE, a citizen of the United States, and a resident of Cambridge, in the county of Middlesex and State of Massachusetts, have invented an Improvement in Dough-Product-Cutting Machines, of which the following description, in connection with the accompanying drawings, is a specification, like characters on the drawings representing like parts.

This invention relates to dough-product cutting machines.

In order that the principle of the invention may be readily understood, I have disclosed a single embodiment thereof in the accompanying drawings, wherein—

Figure 1 is a plan view of a dough product cutting mechanism embodying my invention; Fig. 2 is a side elevation thereof; Fig. 3 is a detail in vertical cross section taken upon the line 3—3 of Fig. 2; Fig. 4 is a plan view of the forward or left hand end of the mechanism viewing Fig. 2, and representing the scrap removers; Fig. 5 is a view partially in side elevation and partially in vertical section, of one of the disk cutters and the adjacent parts; Fig. 6 is a plan view of the devices shown in Fig. 5; Fig. 7 represents in vertical section the disk cutter shown in Fig. 5; Fig. 8 is a detail representing the partial bearing support for certain of the disk cutter arms; Fig. 9 is a plan view representing the series of disk cutters positioned within the heating chamber, the cover of which is removed; Fig. 10 is a side elevation of the construction shown in Fig. 9; Fig. 11 represents mainly an end elevation of one of the scrap removal devices; and Fig. 12 is a side elevation of the construction shown in Fig. 11.

The cutting mechanism embodying this invention is intended more particularly to act upon filled and baked dough products, such, for example, as those having a fig or other fruit-like filling. Obviously, however, the invention may be employed in products not of the filled variety and either upon the completed product or upon the unbaked material. The mechanism, however, is designed for and is peculiarly effective upon baked, filled products of the character indicated.

The cutting mechanism is mounted in a suitable frame work composed of upright sides 1, 1 and cross end pieces 2, 2 indicated in Figs. 1 and 2. For convenience of operation, the frame work is provided with rollers 3, whereby it may be readily moved from place to place in the factory. If desired and preferably I provide an electric or other suitable motor mounted upon the frame work and communicating power to the cutting and feeding mechanism, so that the entire structure is self-contained and may be moved to and readily used at any desired point in the factory. The apparatus is provided with a suitable feeding mechanism for the material that is acted upon. Preferably to that end, I provide flexible endless conveyers, here shown as a pair of sprocket chains 4—4, each having an upper horizontal run, as indicated in Fig. 1. These sprocket chains are mounted upon suitable pulleys 5, 5, 6, 6 upon shafts 7, 8, themselves suitably mounted in the framing of the apparatus. Preferably and as indicated in Fig. 2, the bearings for the shaft 7 may be adjusted by screws 9 or other suitable devices to take up slack in the sprocket chains. The sprocket chains are driven from any suitable point, and preferably from a shaft 10 mounted in the side frames of the apparatus and itself receiving power from a motor mounted in the apparatus or from any other suitable source. In Fig. 1, I have represented in dotted lines a pulley 11, which may be driven from a motor mounted as previously stated or other extraneous source of power. The said pulley 11 is mounted upon a shaft 12 having thereon a worm 13 meshing with and driving a worm wheel 14 upon said shaft 10 which has thereon a pair or other suitable number of sprocket gears 16, about which the sprocket chains 4 pass. In this manner the sprocket chains are continuously driven in the direction of the arrows in Fig. 1.

Between the end members of the framing, the upper runs of the sprocket chains 4 are received in the channeled guides 17, shown most clearly in Figs. 1 and 3. These guides are supported by transverse beams or bars 18, the ends of which are supported upon the upper ends of coiled springs 19 surrounding and supported by bolts or rods 20 secured to and depending from the side members 1, 1 of the frame. Said bolts have at their lower ends suitable washers and nuts 21 receiving the strain of the springs 20. By this construction, the transverse bars or beams 18, together with the channeled guides 17 may yield, if necessary, as, for example, when two of the plates or trays carrying the body material to be cut become partially overlapped.

In order to convey the body material or dough product through the apparatus and to subject it to the action of the cutting blades, I preferably employ a series of pans, trays or supports 22 of substantially the full width of the apparatus and adapted to be supported at suitable intervals upon the upper runs of the sprocket chains 14, to which end said chains may be provided with upright dogs or stops 23, 23 to insure the proper feeding of the pans or trays. These dogs or stops are provided at suitable intervals. In order to insure the correct positioning of the pans or trays, I provide opposite, inwardly inclined side guides 24, which as the pans are fed past them center the pans upon the sprocket chains.

Inasmuch as the apparatus is intended primarily and especially to sever or cut dough products having contents or filling of a sticky nature, it is important that the cutting blades be moistened to prevent the filling adhering thereto. While this result may be accomplished in different ways, preferably I provide a chamber 25 shown in side elevation in Fig. 2 and introduce steam thereinto by a pipe 26 having perforated or open branch pipes 27 within the chamber. The base of the chamber consists of a substantially flat plate 28 resting upon the top of the side frames of the apparatus. The said plate is suitably slotted longitudinally of the apparatus for the operation therethrough of the cutting blades, and in order to provide a water or liquid seal, the said bottom plate is provided with a surrounding channel 29, shown as rectangular in shape in Fig. 9 and receiving the lower edge of the cover or upper portion of the chamber 25. Within the chamber 25, and hence moistened by the steam discharged thereinto, I provide a suitable number of cutting blades. In the preferred operation of the apparatus, the body material is placed upon the pans or trays in the form of elongated bars extending transversely of the apparatus. These pans or trays are conveyed by the sprocket chains 4 beneath and in close proximity to the heated chamber 25, so that the cutting blades may operate through the slotted bottom plate 28 of said chamber and sever the bars into the desired lengths. If the cutters were merely wetted with water, the water or the cutters being cold or substantially so, the water would, to a greater or less extent, be transferred to the bars or other material that is cut and would render them soggy and objectionable. By heating the cutters this is prevented and the moisture if conveyed in slight amounts to the product is substantially withdrawn therefrom by the heat of the cutters. Moreover, by employing steam, a smaller amount of moisture is imparted to the cutters than would be the case if they were wetted with water, and hence there is less danger of conveying the water or moisture to the product.

In Figs. 5 to 10 inclusive, I have represented the cutting blades and the adjacent or supporting parts. Preferably I provide disk like cutters 30, each having a hub 31 mounted in the bearings 32 of the spaced parallel arms 33 of bell crank levers 34 mounted upon a rock shaft 35, which itself is supported in suitable bearings 36 rising from the base plate 28 of the heating chamber 25. The levers 34 are slidable along the rock shaft 35, and each disk cutter 30 is normally pressed toward the dough product or body material by means of a coiled spring 36' surrounding a rod 37 secured at its upper end to the overhanging end 38 of the lever 34. At its lower end the rod 37 is received in a notch 39 in the upper flange of a transverse channeled bar 40 secured to brackets or supports 41 upon the bottom plate 28 of the steam chamber 25. The rod 36 is provided with a suitable washer 42 resting upon the bar 40, and nuts 43 are provided to adjust the tension of the springs 36. In this manner the disk cutters 30 may be forced toward the product or body material under any desired spring tension.

Each hub 31 of the disk cutter 30 is provided with a washer 44 seated upon an angled portion of the hub. The hub 31 is of annular formation and is provided interiorly with two inclined bearing surfaces 45 received upon cone bearings 46 exteriorly threaded as indicated at 47, and hence adjustably mounted in the tapped bearings 32. By adjusting the cone bearings 46, the disk cutters 30 are permitted to rotate with any desired freedom. Inasmuch as the tightening up of the cone bearings 46 might tend to strain or spread the parallel arms 33 of each lever 34, I provide suitable means to hold the cone bearings 46 in place. I have here shown each cone bearing 46 as hollow, one being tapped for the reception of a bolt 48, the head of which takes against an interior shoulder in the other cone bearing, thus holding them and the arms 33 in proper position.

In order to hold the dough product or body material in proper position while it is subjected to the action of the disk cutters 30, I provide a suitable number of holders or positioning devices 49 suitably secured to the under face of the bottom plate 28 of the steam chamber 25 and resting upon or engaging the upper face of the body material, as indicated most clearly in Fig. 5.

In order that the material may be cut into varying lengths, I have provided the bottom plate 28 of the heating chamber 25 with a series of slots 50, shown in Fig. 5, through each of which slots one of the disk cutters 30 operates. In addition to these, I preferably provide certain slots 51 alternating with certain of the slots 50 as indicated in Fig. 9, and when desired I shift certain of the cutting disks 30 into said slots 51, thus providing for cutting the bars into pieces of greater length. I also provide supplemental notches 39' for the rods 37. The cutting of the bars into pieces of greater length involves, in the present embodiment of the invention, the removal of certain of the disk cutters and the readjustment of the remaining disk cutters along the shaft 35. To that end, a certain number of the disk cutters, as, for example, six or more at the right hand end of the shaft 35 (viewing Fig. 9.) are provided with supporting levers 34 having partial bearings 51 extending more than semi-peripherally about the shaft 35. The shaft 35 at its adjacent end is provided with a portion 52 of reduced diameter; that is to say, this portion of the shaft is provided with flattened parallel surfaces, so that when the levers 34 having the partial bearings 51 are slid one after another onto the reduced portion of the shaft 35, they may in turn be removed therefrom. The remaining disk cutters which are preferably provided with the complete bearings shown in Fig. 5 are now redistributed along the shaft 35, so that they operate through the desired slots 50 or 51. It is unnecessary to provide means other than shown for maintaining the levers 34 in distributed positions along the shaft 35, as the rods 37 and springs 36 are sufficient to preserve the desired positions. The said levers 34 may, however, be readily slid along the shaft 35 as described. It will, of course, be understood that by providing other slots 51 or in any other suitable manner, I may cut the bars into either shorter or greater lengths than herein disclosed.

The disk cutters 30 are not positively driven, but are rotated by the feeding action of the dough material in the direction of the arrow in Fig. 5.

Preferably I provide means for removing the scrap material from one or both ends of the severed bars. In Fig. 4, I have represented the scrap material at 53, 53.

As represented most clearly in Figs. 1 and 2, I have provided a counter shaft 53' having thereon a pinion 53'' meshing with and driven by the gear 54 on the shaft 10, and also having a sprocket gear 54', and upon a standard 55 rising from the top of one of the side frames of the apparatus 1 have provided a sprocket pinion 56. About the gear 54' and pinion 56 passes a sprocket chain 57, by which rotation is imparted to a shaft 58 mounted in suitable bearings in the standard 55 and a similar standard at the opposite side of the apparatus. Fast upon the shaft 58 are beveled gears 59 meshing with and driving similar gears 60 upon stud shafts mounted in suitable standards 61 and having thereon gears 62 meshing with intermediate gears 63. which in turn mesh with and drive gears 64, all of said gears being mounted upon stud shafts in said standards 61, 61. Said gears 62, 64 are herein generically termed disks. In this manner the gears 62, 64 upon each side of the apparatus are driven in the same direction. Upon the face of each gear 62, 64, I provide lugs 65, 66 having openings therethrough to receive vertically positioned rods 67, which are provided with encircling coil springs 68 forcing said rods downward. Each rod at its lower end is provided with a foot 69 having in its under face a series of sockets in which are received the upper ends of wires 70 constituting scrap removers. These wires are held in position in their sockets by suitable screws or bolts 71. I have here represented each scrap remover 70 as having a coiled portion 72 providing sufficient resiliency. Between the several scrap removers or wires 70 are provided spacing wires or guides 73.

It will be apparent that in the rotation of the gears 62, 64, the eccentrically positioned lugs 65, 66 impart an orbital movement to the scrap removal wires 70 in a plane transverse to the path of movement of the dough product or body material through the apparatus. Thus the scrap material is constantly removed from each end of the several bars preferably immediately following the cutting of the bars into the desired lengths.

Beneath each series of scrap removers, I provide a suitable scrap receiving chute 74 discharging into a suitable receptacle 75.

The material to be cut is placed upon the pans or trays which are successively presented by the sprocket chains 4 to the action of the disk cutters 30. In the event that two of the trays have been so positioned that they overlap, the transverse bars or beams 18 yield sufficiently to prevent damage. The material is carried at the proper speed beneath the disk cutters 30 and are thereby severed into the desired lengths. After emerging from beneath the steam chamber 25, the severed bars are presented to the action of the scrap removers, whereby the scrap ends 53 are discharged into the receptacle or receptacles 75. The moistening of the disk cutters 30 effectively prevents adherence of the contents or material of the product to said cutters to an objectionable extent, and thus insures the clean and efficient severing of the material. After the bars have been severed and the scrap removed, the trays or pans are lifted from the sprocket chains 4 or may be discharged in any suitable manner. It will be apparent from the foregoing description that I have provided an exceedingly efficient apparatus for severing the material into desired lengths and that I have provided means whereby suitable variations in the lengths of the ultimate product may be provided for.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Dough product cutting mechanism comprising feeding means, feeding trays or supports carried thereby, cutters mounted in operative relation to said feeding means, and means to apply moistening vapor to said cutters.

2. Dough product cutting mechanism comprising flexible, endless, feeding means, feeding trays or supports adapted to be positioned thereon, cutters mounted for rocking movement in operative relation to said feeding means, spring means tending normally to rock said cutters toward said feeding means and means to apply moistening vapor to said cutters.

3. Dough product cutting mechanism comprising traveling feeding means, feeding trays or supports positionable thereon, inclined edge guides for said trays or supports, cutters mounted in operative relation to said feeding means and means to apply a heated moistening agent to said cutters.

4. Dough product cutting mechanism comprising traveling feeding means, feeding trays or supports positionable thereon, oppositely positioned edge guides for said trays or supports inclined toward each other, rotary cutters coöperating with said feeding means, a moistening chamber in which said cutters are mounted, and means to admit a moistening medium to said chamber.

5. Dough product cutting mechanism comprising a product support, cutters and means for directing steam against the latter.

6. Dough product cutting mechanism comprising a product support, a steam heated chamber and a disk cutter mounted in said chamber in contact with the steam and operable therethrough to sever the dough product.

7. Dough product cutting mechanism comprising a product support, a heated chamber above but in proximity thereto and having a slotted bottom, and a shaft carrying a disk cutter and mounted in said chamber, and operable through the slotted bottom to sever the dough product.

8. Dough product cutting mechanism comprising a product support, a steam heated chamber above but in proximity thereto, a liquid seal for said chamber, and a blade within said chamber in contact with the steam and operable therethrough to cut the dough product.

9. Dough product cutting mechanism comprising a product support, a steam heated chamber above but in proximity thereto, and having a slotted bottom, a shaft in said chamber having a series of disk blades in contact with the steam operable through said slots upon the dough product and a liquid seal for the chamber.

10. Dough product cutting mechanism comprising an elongated, traveling product support adapted to receive trays or the like, cutting mechanism in operative relation to said support, and yielding sustaining means for said support positioned materially in advance of and also beneath said cutting mechanism, thereby to permit yielding of misplaced trays in advance of said cutting mechanism.

11. Dough product cutting mechanism comprising a flexible, traveling, product support, cutting mechanism above said support, and one or more yielding, sustaining devices for said support beneath and extending longitudinally thereof, thereby yieldingly to support a prolonged portion of said product support before said product is subjected to the action of said cutting mechanism.

12. Dough product cutting mechanism comprising a plurality of endless, traveling band supports, guide pulleys therefor, one or more yielding, sustaining devices for said supports positioned between said pulleys and yieldingly supporting substantially the entire upper run of said band supports, and cutters in proximity to said supports.

13. Dough product cutting mechanism comprising a plurality of endless, flexible supports, guiding pulleys therefor, and spring supported sustaining devices for said supports, arranged transversely thereof between said pulleys and supporting substantially the entire upper run of said supports.

14. Dough product cutting mechanism comprising a product support, cutters above and co-acting with said support, spring means to press said cutters yieldingly toward said supports, positioning means between the adjacent cutters for the dough product while engaged by said cutters, an inclosure for said cutters, and means for admitting a moistening fluid to said inclosure.

15. Dough product cutting mechanism comprising a product support, cutting disks to engage the dough product thereon, product positioning means between adjacent cutting disks means yieldingly to press said disks toward the product, an inclosure for said cutting disks and means to introduce a moistening fluid within said inclosure to said disks.

16. Dough product cutting mechanism comprising a product support, a cutting disk to engage the dough product thereon, a bell crank pivoted supporting arm for said disk, a spring engaging the free arm of said bell crank to press the disk yieldingly toward said product, and means coöperating with said spring whereby the force thereof, and therefore the pressure of said disk against said product, may be readily adjusted.

17. Dough product cutting mechanism comprising a product support, a cutting disk to engage the dough product thereon, a rocking arm for said disk a spring 36' co-acting with said arm to press the cutting disk toward the dough product, a support 40 for said spring, and means coöperating with said support for adjusting the force of said spring 36'.

18. Dough product cutting mechanism comprising a product support, a cutting disk to engage the dough product thereon, a pivoted supporting arm for the disk, a spring 36' co-acting with said arm to press the disk toward the dough product a rod 37 about which said spring is positioned and tension adjusting means for said spring coöperating with said rod 37.

19. Dough product cutting mechanism comprising a product support, a shaft thereabove, and a series of cutting disks upon said shaft and co-acting with said support, said disks being individually adjustably movable along said shaft, and adjustable means yieldingly to press said cutter disks toward said support, said means including springs 36' or supporting rods 37 therefor, the bar 40 and adjusting means for said springs coöperating with said rods and bar.

20. Dough product cutting mechanism comprising a product support, a cutter-supporting shaft in cutting relation thereto and having a reduced portion, and a cutter mounted upon said shaft, slidable therealong to and removable from the shaft at said reduced portion.

21. Dough product cutting mechanism comprising a product support, a cutter-supporting shaft in cutting relation thereto and having a reduced portion and a disk cutter having a partial bearing mounted upon said shaft, slidable therealong and radially removable from the shaft at said reduced portion.

22. Dough product cutting mechanism comprising a product support, a cutter-supporting shaft in cutting relation thereto and having a reduced portion, and a disk cutter having an incomplete bearing extending more than semi-peripherally of the shaft, and slidable along the shaft to and removable therefrom at said reduced portion.

23. Dough product cutting mechanism comprising a product support, a rotatable cutter coöperating therewith, opposed conical bearing supports for said cutter, spaced parallel bars wherein said bearing supports are respectively mounted, and a rock shaft wherein said arms are mounted.

24. Dough product cutting mechanism comprising a product support, a rotatable, laterally adjustable, disk cutter coöperating therewith and having a hub provided with inwardly inclined, opposite bearing faces 45, opposed conical bearing supports in engagement with said faces, and spaced parallel arms wherein said bearing supports are mounted, said bearing supports including adjustable cone bearings 46 having contact with said faces 45.

25. Dough product cutting mechanism comprising a product support, a rotatable disk cutter coöperating therewith and having opposite bearing faces 45 inwardly inclined toward each other, two adjustable cone bearings in engagement with said faces and spaced arms upon which said cone bearings are mounted.

26. Dough product cutting mechanism comprising a product support, a pair of spaced disk cutter supporting arms, each having an inwardly tapering bearing support, adjustable conical bearings carried by said arms and having engagement with said supports, and means to hold said adjustable bearings and said arms in position.

27. Dough product cutting mechanism comprising a product support, a series of co-acting cutters, a disk or disks mounted upon an axis or axes extending longitudinally of the path of feed of the product and scrap removers carried by said disk or disks.

28. Dough product cutting mechanism comprising a product support, a series of co-acting cutters, a disk or disks mounted upon an axis or axes extending longitudinally of the path of feed of the product and scrap removers carried by said disk or disks and movable transversely to the path of feed.

29. Dough product cutting mechanism comprising a product support, a series of co-acting cutters, and a disk having an eccentrically mounted, rod-like scrap remover.

30. Dough product cutting mechanism comprising a product support, a series of co-acting cutters and a co-acting disk having a spring pressed scrap remover.

31. Dough product cutting mechanism comprising a product support, a series of co-acting cutters, an upright scrap remover, and means including a rotary member and an arm eccentrically mounted thereon and supporting said scrap remover to impart an orbital movement thereto, transversely of the path of movement of the dough product.

32. Dough product cutting mechanism comprising a product support, a series of coacting cutters, a rotatable disk carrying an eccentrically mounted spring pressed arm having a series of scrap removers, and rotating means for said disk, thereby to impart orbital movements to said scrap removers.

33. Dough product cutting mechanism comprising a product support, a series of coacting disk cutters, a shaft extending transversely of said support, disk supporting arms pivoted intermediate their lengths upon said shaft, cutting disks upon one end of each of said arms, a spring surrounded rod connected to the other ends of said arms and to a fixed support, and means to adjust the tension of said springs.

34. Dough product cutting mechanism comprising a product support, cutters, and means to elevate the temperature of and to moisten the latter.

35. Dough product cutting mechanism comprising a product support, a moistening chamber above but in proximity to said support and having a slotted bottom, means for supplying moisture to said chamber and a shaft having a disk cutter and mounted in said chamber, said disk cutter protruding at the slotted bottom to sever the dough product.

36. Dough product cutting mechanism comprising a flexible, endless, traveling support, a longitudinally extending guide for the upper run of said support, yielding sustaining devices for said guide, and cutters in proximity to said support.

37. Dough product cutting mechanism comprising a plurality of endless, traveling, band supports, a longitudinally extending guide strip 17 for each of said supports, yielding, sustaining means for said guides and cutters in proximity to said supports.

38. Dough product cutting mechanism comprising a product support, rotary cutters mounted in operative relation thereto and means to heat and to moisten said cutters.

39. Dough product cutting mechanism comprising a product support, a steam receiving chamber and a disk cutter mounted in said chamber and upon which the steam may impinge, said disk cutter being operable through said chamber to sever the dough product.

40. Dough product cutting mechanism comprising a product support, a moistening chamber above and in proximity thereto and having a slotted bottom, means to supply moisture to said chamber, and a shaft carrying a disk cutter and mounted in said chamber, and operable through the slotted bottom to sever the dough product.

41. Dough product cutting mechanism comprising a product support, a cutter, and means for wetting said cutters with a fluid at an elevated temperature.

42. Dough product cutting mechanism comprising a product support, a cutter, and means to wet said cutter with a heated fluid.

43. Dough product cutting mechanism comprising a product support, a cutter, and means to wet said cutter with a vapor.

44. Dough product cutting mechanism comprising a product support, a cutter, and means for effecting heating and moistening of the latter.

45. Dough product cutting mechanism comprising a traveling product support, a rotary cutter coöperating therewith, and means for effecting the heating and moistening of the latter.

46. Dough product cutting mechanism comprising a product support, a cutter, and means for directing a vapor against the latter.

47. Dough product cutting mechanism comprising in combination, a product support, a chamber, a disk cutter mounted in said chamber and operable therethrough to sever the dough product, and means to admit a moistening substance to said chamber.

48. Dough product cutting mechanism comprising a product support, a chamber above but in proximity thereto, a liquid seal for said chamber, a blade within said chamber and operable therethrough to cut the dough product, and means to admit a moistening substance to said chamber.

49. Dough product cutting mechanism comprising a product support, a chamber above but in proximity thereto and having a slotted bottom, a shaft in said chamber having a series of disk blades operable through said slots upon the dough support, a liquid seal for said chamber, and means to admit a moistening substance to said chamber.

50. Dough product cutting mechanism comprising traveling feeding means, feeding trays or supports positionable thereon, rotary cutters coöperating with said feeding means, a moistening chamber in which said cutters are mounted, and means for admitting moistening vapor to said chamber.

51. Dough product cutting mechanism comprising traveling means, feeding trays or supports positionable thereon, rotary cutters coöperating with said feeding means, a moistening chamber in which said cutters are mounted, and means for admitting moistening vapor to said chamber.

52. Dough product cutting mechanism comprising a product support, cutters above and coöperating with said support, means to apply a moistening liquid to said cutters, a chamber inclosing said cutters and into which the moistening liquid is delivered, spring means to press said cutters yieldingly toward said support, and positioning means mounted to engage the top of the product while the latter is engaged by the cutters.

53. Dough product cutting mechanism comprising a product support, cutters above and co-acting with said support, means to apply a moistening liquid to said cutters, said means including a pipe 26, a chamber into which the same discharges, spring means to press said cutters yieldingly toward said support, and positioning means for the dough product while engaged by the cutters, located between the outer cutters of the series.

54. Dough product cutting mechanism comprising a product support, cutting disks to engage the dough product thereon an inclosure for said disks, means to apply a moistening fluid to said inclosure, means yieldingly to press said disks toward the product, and means yieldingly to press the product support toward the cutting disks.

55. Dough product cutting mechanism comprising a product support, a cutting disk to engage the dough product thereon, a pivoted supporting arm for said disk, means cooperating with said arm normally to maintain said cutting disk in position to effect complete severance of said dough product, and means to vary the force of action of said cooperating means, said means including spring 36', a supporting rod 37 therefor and a nut 42.

56. Dough product cutting mechanism comprising a product support, a cutting disk to engage the dough product thereon, a bell crank supporting lever for said disk, and means cooperating with the free arm of said bell crank lever normally to maintain said cutting disk substantially in contact with said product support, said means including a spring 36' and its support 40 therefor.

57. Dough product cutting mechanism comprising a product support, a shaft thereabove, a series of cutting disks upon said shaft and co-acting with said support, means to supply a moistening fluid to said disks, said disks being individually adjustably movable along said shaft, and means to maintain said cutting disks yieldingly substantially in engagement with said support, said means including the springs 36' and the support 40 therefor.

58. Dough product cutting mechanism comprising a product support, a pair of disk cutter supporting arms 33, each having a bearing support 32, adjustable conical bearings 46, 47 mounted in and protruding through said supports, and adjustable means 48 to hold said bearings and their arms in position.

59. Dough product cutting mechanism comprising a product support, a cutter mounted in operative relation thereto, means to inclose said cutter, and means to admit a moistening agent to said inclosing means.

60. Dough product cutting mechanism comprising a product support, a cutter mounted in operative relation thereto, means to inclose said cutter, and means to admit a moistening vapor to said inclosing means.

In testimony whereof, I have signed my name to this specification, in the presence of two subscribing witnesses.

EDWARD E. LAWRENCE.

Witnesses:
T. J. SHEENN,
W. W. CLARK.